INVENTORS
WILLY BOCK
HANS PROHASKA

BY

ATTORNEYS

United States Patent Office 3,085,277
Patented Apr. 16, 1963

3,085,277
CONNECTING DEVICE FOR WINDSHIELD WIPER
Willy Bock and Hans Prohaska, Bietigheim, Wurttemberg, Germany, assignors to SWF-Spezialfabrik fur Autozubehor Gustav Rau G.m.b.H., Bietigheim, Wurttemberg, Germany
Filed Aug. 3, 1959, Ser. No. 831,256
Claims priority, application Germany Aug. 8, 1958
8 Claims. (Cl. 15—250.32)

The present invention relates to improvements in windshield wipers for motor vehicles and especially to a windshield wiper in which the free end of the wiper arm is bent over backwardly so as to form a hook, and this hook-shaped portion is pivotably mounted on a bearing pin which is secured to the wiper blade unit.

In a known windshield wiper construction of the above-mentioned type, the hook-shaped end of the wiper arm passes around the bearing pin on the blade unit, and the distance between the two substantially parallel arms of the hook is made twice as large as the diameter of the bearing pin. The blade unit then carries a leaf spring which presses the hook against the bearing pin. Although this prior construction has the advantage that the blade unit can tilt during the wiping operation, this tilting results in unpleasant squeaking and rattling noises.

In another prior windshield wiper construction, the hook-shaped end of the wiper arm passes around a two-armed yokelike spring which is mounted on a bearing pin which is secured to the blade unit. In the operative position, the two-armed spring is in locking engagement with the hook-shaped end of the wiper arm.

It is an object of the present invention to provide a considerably more simplified and improved device for securing the wiper blade to the wiper arm. This object is attained according to the present invention by fitting a substantially cylindrical bushing consisting of a highly elastic material upon a bearing pin mounted on the wiper blade unit so that, when the latter is hooked into the eye formed between the two arms of the hook-shaped end of the wiper arm, the outer peripheral surface of the bushing engages with the inner surface of this eye along a distance amounting to more than 180°. The two arms of the hook-shaped end portion of the wiper arm diverge toward the free end thereof so that at this end they are spaced from each other at a distance which is at least equal to the diameter of the elastic bushing. In order to increase the elasticity of the bushing, the same is made of a suitable shape, for example, by being provided with grooves in its outer surface extending in the axial direction or in the peripheral direction of the bushing. In order to limit the tilting movement of the wiper blade relative to the wiper arm during the operation of the windshield wiper, the blade unit may be shaped so that a part thereof engages between the two arms of the hook-shaped end portion of the wiper arm.

When the blade unit is being inserted between the two arms of the hook-shaped end of the wiper arm, the elastic bushing will be compressed by these two arms, which converge from the open end in the direction toward the eye of the hook, until the bushing comes to rest in this eye. The two arms then engage with the bushing along a distance greater than one-half of the periphery of the bushing. This prevents any accidental disengagement of the blade unit from the wiper arm although, because of the elasticity of the bushing, it is easily possible to remove the blade from the wiper arm without the use of any tools.

These objects, features, and advantages of the present invention will become more clearly apparent from the following detailed description thereof, particularly when read with reference to the accompanying drawings, in which—

FIGURE 3 shows a vertical longitudinal cross section of the mounting bracket on the blade unit and of the hook-shaped end portion of the wiper arm connected thereto; while

Figure 1:
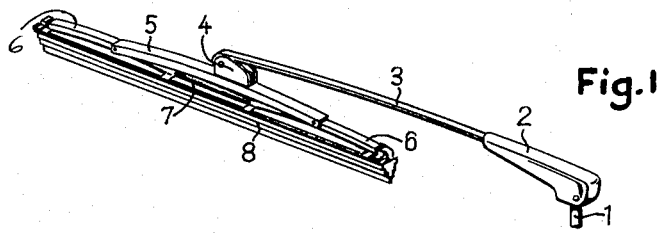
FIGURE 1 shows a perspective view of a wiper blade unit attached to a wiper arm which is mounted on the wiper shaft.

As illustrated in FIGURE 1, the head 2 of the wiper arm 3 is non-rotatably secured to the wiper shaft 1. The other end of wiper arm 3 is hook-shaped and pivotably connected to a bracket 4 which is secured to the back rail 5 of the blade unit. This rail 5 is connected to the two intermediate rails 6 and 7 which carry the metal back 7 holding the rubber blade 8.

Figure 2:
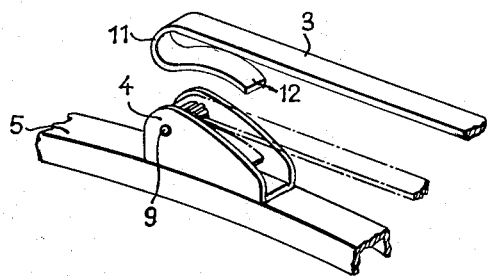
FIGURE 2 shows an enlarged perspective view of the hook-shaped end portion of the wiper arm and of a mounting bracket on the blade unit to which the wiper arm is to be connected.
Figure 3:
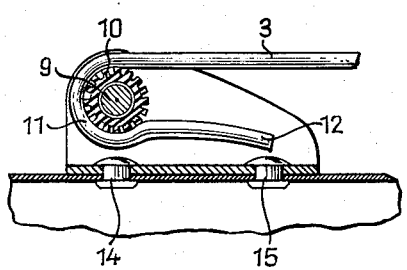

FIGURES 2 and 3 illustrate the manner of attaching the wiper arm 3 to the bracket 4 on the back rail 5. Bracket 4 is of a U-shaped construction and rigidly secured to back rail 5, for example, by rivets 14 and 15. A bearing pin 9 is mounted in the two arms of bracket 4 and thus extends across the same. It carries a substantially cylindrical bushing 10 consisting of an elastic material which is provided in its outer peripheral surface with grooves 10' which extend in the axial direction. The hook-shaped end portion of wiper arm 3 is bent so as to form an eye 11 which encompasses and engages with more than one-half of the periphery of bushing 10. The free end 12 of wiper arm 3 is bent outwardly so as to extend at an acute angle relative to the main body of arm 3 and at a distance therefrom which is at least equal to the outer diameter of bushing 10.

Figure 4:
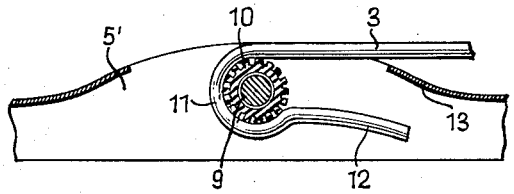
FIGURE 4 shows a similar cross section of a modification of the connecting device, in which the bearing pin to which the hook-shaped end portion of the wiper arm is attached is secured to the back rail of the blade unit.

FIGURE 4 illustrates a modification of the invention in which, in place of the bracket 4 as shown in FIGURES 1 to 3, the back rail 5' is provided with a central, upwardly curved projection 16 within which the bearing pin 9 is mounted which likewise carries an elastic bushing 10 with grooves 10' therein. The back of rail 5' is cut out so that as to have an opening 17 into which the hook-shaped end of wiper arm 3 can be inserted between the two side arms of rail 5' and be slipped over bushing 10. The opening 17 in the back of rail 5' is made of such a size that the part 13 thereof will engage between parts 3 and 12 of the wiper arm and thus limit the pivotal movement of the wiper blade relative to wiper arm 3.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A device for connecting a windshield wiper blade to a wiper arm the end portion of which has been rearwardly bent to form a hook-shaped end portion including two arms and an intermediate eye, said two arms being constituted by said wiper arm and the rearwardly bent portion thereof, consisting of said hook-shaped end portion, mounting means for said wiper arm secured to said wiper blade and including a bearing pin, and a substantially cylindrical elastic bushing mounted on said bearing pin, said bearing pin and said bushing being inserted between the two arms of said hook-shaped end portion and into said eye to secure said wiper blade to said wiper arm, said hook-shaped end portion being so constructed and arranged that upon insertion of said bearing pin between said two arms of said hook-shaped end portion and into said eye, said two arms surround and engage with said bushing along more than one half of the periphery of said bushing, said two arms diverging from each other in the direction away from said intermediate eye.

2. A device for connecting a windshield-wiper blade to a wiper arm the end portion of which has been rearwardly bent to form a hook-shaped end portion including two arms and an intermediate eye, said two arms being constituted by said wiper arm and the rearwardly bent portion thereof, comprising said hook-shaped end portion, mounting means for said wiper arm secured to said wiper blade and including a substantially cylindrical elastic bushing mounted on said bearing pin, said elastic bushing having a plurality of grooves in its outer surface for increasing the elasticity thereof, said bearing pin and said bushing being inserted between the two arms of said hook-shaped end portion and into said eye to secure said wiper blade to said wiper arm, said hook-shaped end portion being so constructed and arranged that upon insertion of said bearing pin between said two arms of said hook-shaped end portion and into said eye, said two arms surround and engage with said bushing along more than one half of the periphery of said bushing, said two arms of said hook-shaped portion of said wiper arm diverging from each other toward the free end of one of said arms so that at said free end said two arms are spaced from each other a distance at least equal to the outer diameter of said elastic bushing.

3. A connecting device as defined in claim 1, in which said mounting means for said wiper arm has a part projecting between said two arms of said hook-shaped end portion so constructed and arranged that when said wiper blade is connected to said wiper arm, said projecting part limits the pivotal movement of said wiper blade relative to said wiper arm.

4. A device for connecting a windshield wiper blade to a wiper arm the end portion of which has been rearwardly bent to form a hook-shaped end portion including two arms and an intermediate eye, said two arms being constituted by said wiper arm and the rearwardly bent portion thereof, consisting of said hook-shaped end portion mounting means for said wiper arm including bracket means secured to said wiper blade, said bracket means having two arm portions, and a bearing pin mounted within said bracket means and extending between said two arm portions, and a substantially cylindrical elastic bushing mounted on said bearing pin, said elastic bushing having a plurality of grooves in the outer surface thereof for increasing the elasticity thereof, said bearing pin and said bushing being inserted between said two arms of said hook-shaped end portion and into said eye to secure said wiper blade to said wiper arm, said hook-shaped end portion being so constructed and arranged that upon insertion of said bearing pin between said two arms of said hook-shaped end portion and into said eye, said two arms surround and engage with said bushing along more than one half of the periphery of said bushing, said two arms diverging from each other in the direction away from said intermediate eye.

5. A device for connecting a windshield-wiper blade to a wiper arm the end portion of which has been rearwardly bent to form a hook-shaped end portion including two arms and an intermediate eye, said two arms being constituted by said wiper arm and the rearwardly bent portion thereof comprising said hook-shaped end portion, mounting means for said wiper arm including bracket means secured to said wiper blade, said bracket means having two arm portions and a bearing pin mounted within said bracket means and extending between said two arm portions and a substantially cylindrical elastic bushing mounted on said bearing pin, said elastic bushing having a plurality of grooves in the outer surface thereof for increasing the elasticity thereof, said bearing pin and said bushing being inserted between said two arms of said hook-shaped end portion and into said eye to secure said wiper blade to said wiper arm, said hook-shaped end portion being so constructed and arranged that upon insertion of said bearing pin between said two arms of said hook-shaped end portion and into said eye, said two arms surround and engage with said bushing along more than one half of the periphery of said bushing, said two arms of said hook-shaped portion of said wiper arm diverging from each other toward the free end of one of said arms so that at said free end said two arms are spaced from each other at a distance at least equal to the outer diameter of said elastic bushing.

6. A connecting device as defined in claim 5, wherein said wiper blade has a back rail and wherein said bracket means is a substantially U-shaped bracket rigidly secured to said back rail.

7. A connecting device as defined in claim 5, wherein said wiper blade has a back rail including a substantially upwardly curved projection having an opening therein, said bracket means being constituted by said back rail including said projection and said bearing pin extending across said bracket means within the area of said opening.

8. A connecting device as defined in claim 7, wherein said hook-shaped end portion and said opening are so constructed and arranged that when said bearing pin is inserted into the eye of said hook-shaped end portion, a part of said back rail projects between the two arms of said hook-shaped end portion to limit pivotal movement of said wiper blade relative to said wiper arm.

References Cited in the file of this patent

UNITED STATES PATENTS 2,091,928    Horton _____ Aug. 31, 1937
2,694,827    Bacher _____ Nov. 23, 1954